United States Patent
Watfa et al.

(10) Patent No.: US 11,540,181 B2
(45) Date of Patent: Dec. 27, 2022

(54) HANDLING OF NETWORK SLICE INFORMATION FOR ROAMING USER EQUIPMENT (UE)

(71) Applicant: QUALCOMM Incorporated, San Diego, CA (US)

(72) Inventors: Mahmoud Watfa, St. Leonard (CA); Lenaig Genevieve Chaponniere, La Jolla, CA (US); Stefano Faccin, San Ysidro, CA (US); Hong Cheng, Bridgewater, NJ (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 16/900,502

(22) Filed: Jun. 12, 2020

(65) Prior Publication Data

US 2020/0396648 A1    Dec. 17, 2020

Related U.S. Application Data

(60) Provisional application No. 62/862,102, filed on Jun. 16, 2019.

(51) Int. Cl.
*H04W 36/00* (2009.01)
*H04W 8/06* (2009.01)

(52) U.S. Cl.
CPC ......... *H04W 36/0033* (2013.01); *H04W 8/06* (2013.01); *H04W 36/0016* (2013.01)

(58) Field of Classification Search
CPC ..... H04W 48/18; H04W 36/14; H04W 36/00; H04W 60/04; H04W 36/0016;
(Continued)

(56) References Cited

U.S. PATENT DOCUMENTS

2019/0230556 A1* 7/2019 Lee .................. H04W 28/16
2019/0335392 A1* 10/2019 Qiao ................ H04W 48/18
(Continued)

FOREIGN PATENT DOCUMENTS

CN    109803336 A  *  5/2019  ........... H04L 67/146
CN    110636579 A  *  12/2019  ............ H04W 28/06
(Continued)

OTHER PUBLICATIONS

International Search Report and Written Opinion—PCT/US2020/037641—ISA/EPO—dated Oct. 29, 2020.
(Continued)

*Primary Examiner* — Dung Hong
(74) *Attorney, Agent, or Firm* — Patterson+ Sheridan, L.L.P.

(57) ABSTRACT

Certain aspects of the present disclosure provide techniques for handling slice information for a roaming user equipment (UE). In some cases, the UE may send, to a network entity, a request with an information element (IE) indicating one or more protocol data unit (PDU) sessions to be transferred from a source network to a target network. After receiving, from the network entity, a response with an IE identifying one or more of the PDU sessions allowed to be transferred to the target network and indicating slice information applicable in the target network for the one or more PDU sessions allowed to be transferred, the UE may update slice information for each of the PDU sessions allowed to be transferred based on the IE in the response.

22 Claims, 14 Drawing Sheets

(58) Field of Classification Search
CPC ............ H04W 24/02; H04W 36/0005; H04W 36/0011; H04W 36/0022; H04W 36/0027; H04W 36/0033; H04W 36/0055; H04W 36/0083
See application file for complete search history.

(56) References Cited

U.S. PATENT DOCUMENTS

| | | | |
|---|---|---|---|
| 2020/0053619 A1* | 2/2020 | Sartori | H04W 36/0016 |
| 2020/0359440 A1* | 11/2020 | Qiao | H04W 40/246 |

FOREIGN PATENT DOCUMENTS

| | | | | |
|---|---|---|---|---|
| WO | WO-2019098745 A1 * | 5/2019 | ............ | H04W 36/00 |
| WO | WO-2019137521 A1 * | 7/2019 | ............ | H04W 36/00 |
| WO | WO-2019182430 A1 * | 9/2019 | ............ | H04W 60/04 |
| WO | WO-2019223656 A1 * | 11/2019 | ........ | H04W 36/0011 |

OTHER PUBLICATIONS

Partial International Search Report—PCT/US2020/037641—ISAEPO—dated Sep. 8, 2020.

Qualcomm Incorporated: "Discussion Paper on Handling of S-NSSAI for PDU Session for Slicing Interworking", 3GPP Draft, SA WG2 Meeting #S2-134, S2-1907095-DP S-NSSAI_PDU_Session Interworking V1, 3rd Generation Partnership Project (3GPP), Mobile Competence Centre, 650, Route Des Lucioles, F-06921 Sophia-Antipolis Cedex, France, vol. SA WG2, No. Sapporo, Japan, Jun. 24, 2019-Jun. 28, 2019, Jun. 17, 2019 (Jun. 17, 2019), XP051752071, 4 Pages, chapter 1.1, chapter 1.2, chapter 1.3.

Qualcomm Incorporated, et al., "Discussion on NSSAI Handling in Roaming Cases", 3GPP Draft, 3GPP TSG CT WG1 Meeting #120, C1-196395, 3rd Generation Partnership Project (3GPP), Mobile Competence Centre, 650, Route Des Lucioles, F-06921 Sophia-Antipolis Cedex, France, vol. CT WG1, No. Portoroz, Slovenia, Oct. 7, 2019-Oct. 11, 2019, Sep. 30, 2019 (Sep. 30, 2019), XP051802787, 3 Pages, chapter 2.1, chapter 2.2, chapter 2.3.

Qualcomm Incorporated et al., "OI#11: TS 23.501: Determining S-NSSAIs during EPC to 5GC Mobility", 3GPP Draft, SA WG2 Meeting #124, S2-178266_TS23501_Determining_SNSSAIS_EPC_5GC_Mobility, 3rd Generation Partnership Project (3GPP}, Mobile Competence Centre, 650, Route Des Lucioles, F-06921 Sophia-Antipolis Cedex, Fra, vol. SA WG2, No. Reno, NV, USA, Nov. 27, 2017-Dec. 1, 2017, Nov. 21, 2017 (Nov. 21, 2017), XP051379326, 4 Pages, chapter 2.1, chapter 2.2, chapter 5.15.7.1x.2.

* cited by examiner

| 8 | 7 | 6 | 5 | 4 | 3 | 2 | 1 | |
|---|---|---|---|---|---|---|---|---|
| \multicolumn{8}{|c|}{S-NSSAI IEI} | octet 1 |
| \multicolumn{8}{|c|}{Length of S-NSSAI contents} | octet 2 |
| \multicolumn{8}{|c|}{SST} | octet 3 |
| \multicolumn{8}{|c|}{SD} | octet 4* octet 6* |
| \multicolumn{8}{|c|}{Mapped HPLMN SST} | octet 7* |
| \multicolumn{8}{|c|}{Mapped HPLMN SD} | octet 8* octet 10* |

FIG. 4

| 8 | 7 | 6 | 5 | 4 | 3 | 2 | 1 | |
|---|---|---|---|---|---|---|---|---|
| PDU session with updated S-NSSAI IEI | | | | | | | | octet 1 |
| Length of PDU session with updated S-NSSAI contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| S-NSSAI value 1 | | | | | | | | octet 5<br>octet m |
| S-NSSAI value 2 | | | | | | | | octet m+1*<br>octet n* |
| ... | | | | | | | | octet n+1*<br>octet u* |
| S-NSSAI value n | | | | | | | | octet u+1*<br>octet v* |

FIG. 8A

| 8 | 7 | 6 | 5 | 4 | 3 | 2 | 1 | |
|---|---|---|---|---|---|---|---|---|
| PDU session with updated S-NSSAI IEI | | | | | | | | octet 1 |
| Length of PDU session with updated S-NSSAI contents | | | | | | | | octet 2 |
| Number of updated S-NSSAIs | | | | | | | | octet 3 |
| PDU session identity | | | | | | | | octet 4 |
| S-NSSAI value 1 | | | | | | | | octet 5<br><br>octet m |
| ... | | | | | | | | octet m+1*<br><br>octet u* |
| PDU session identity | | | | | | | | octet u+1* |
| S-NSSAI value n | | | | | | | | octet u+2*<br><br>octet v* |

FIG. 8B

HANDLING OF NETWORK SLICE INFORMATION FOR ROAMING USER EQUIPMENT (UE)

PRIORITY CLAIM(S)

This application claims priority to and the benefit of U.S. Provisional Application No. 62/862,102, filed on Jun. 16, 2019, which is expressly incorporated by reference in its entirety as if fully set forth below and for all applicable purposes.

INTRODUCTION

Aspects of the present disclosure relate to wireless communications, and more particularly, to techniques for communications in wireless systems.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include handling of network slice information for a roaming user equipment (UE).

Certain aspects provide a method for wireless communications by a user equipment (UE). The method generally includes sending, to a network entity, a request with an information element (IE) indicating one or more protocol data unit (PDU) sessions to be transferred from a source network to a target network, receiving, from the network entity, a response with an IE identifying one or more of the PDU sessions allowed to be transferred to the target network and indicating slice information applicable in the target network for the one or more PDU sessions allowed to be transferred, and updating slice information for each of the PDU sessions allowed to be transferred based on the IE in the response.

Certain aspects provide a method for communications by a network entity. The method generally includes receiving, from a user equipment (UE), a request with an information element (IE) indicating one or more protocol data unit (PDU) sessions to be transferred from a source network to a target network, determining slice information for one or more of the PDU sessions allowed to be transferred, and sending, to the UE, a response with an IE identifying the one or more of the PDU sessions allowed to be transferred to the target network and indicating the slice information applicable in the target network for the one or more PDU sessions allowed to be transferred.

Certain aspects provide a method for wireless communications by a user equipment (UE). The method generally includes receiving an indication to start a backoff timer, determining mapping information for a protocol data unit (PDU) session, and refraining from sending session management requests for PDU sessions which have same mapping information as the PDU session while the backoff timer is running.

Certain aspects provide a method for wireless communications by a user equipment (UE). The method generally includes receiving, from a network entity, an information element (IE) identifying one or more of the PDU sessions and indicating slice information for those PDU sessions, receiving a request for a packet data network (PDN) connection reactivation, and processing the request based on the information in the IE.

Certain aspects provide a method for wireless communications by a user equipment (UE). The method generally includes receiving, from a network entity, an information element (IE) identifying one or more of the PDU sessions and indicating slice information for those PDU sessions, and updating slice information for each of the PDU sessions based on the IE.

Certain aspects provide a method for wireless communications by a network entity. The method generally includes determining slice information for one or more of the PDU sessions with a user equipment (UE), and sending the UE an IE indicating the slice information for those PDU sessions.

Certain aspects provide an apparatus for wireless communications by a user equipment (UE). The apparatus generally includes means for sending, to a network entity, a request with an information element (IE) indicating one or more protocol data unit (PDU) sessions to be transferred from a source network to a target network, means for receiving, from the network entity, a response with an IE identifying one or more of the PDU sessions allowed to be transferred to the target network and indicating slice information applicable in the target network for the one or more PDU sessions allowed to be transferred, and means for updating slice information for each of the PDU sessions allowed to be transferred based on the IE in the response.

Certain aspects provide an apparatus for wireless communications by a network entity. The apparatus generally includes means for receiving, from a user equipment (UE), a request with an information element (IE) indicating one or more protocol data unit (PDU) sessions to be transferred from a source network to a target network, means for determining slice information for one or more of the PDU sessions allowed to be transferred, and means for sending, to the UE, a response with an IE identifying the one or more of the PDU sessions allowed to be transferred to the target network and indicating the slice information applicable in the target network for the one or more PDU sessions allowed to be transferred.

Certain aspects provide an apparatus for wireless communications by a user equipment (UE). The apparatus generally includes means for receiving an indication to start a backoff timer, means for determining mapping information for a protocol data unit (PDU) session, and means for refraining from sending session management requests for PDU sessions which have same mapping information as the PDU session while the backoff timer is running.

Certain aspects provide an apparatus for wireless communications by a user equipment (UE). The apparatus generally includes means for receiving, from a network entity, an information element (IE) identifying one or more of the PDU sessions and indicating slice information for those PDU sessions, means for receiving a request for a packet data network (PDN) connection reactivation, and means for processing the request based on the information in the IE.

Certain aspects provide an apparatus for wireless communications by a user equipment (UE). The apparatus generally includes means for receiving, from a network entity, an information element (IE) identifying one or more of the PDU sessions and indicating slice information for those PDU sessions, and means for updating slice information for each of the PDU sessions based on the IE.

Certain aspects provide an apparatus for wireless communications by a network entity. The apparatus generally includes means for determining slice information for one or more of the PDU sessions with a user equipment (UE), and means for sending the UE an IE indicating the slice information for those PDU sessions.

Certain aspects provide a computer readable medium storing computer executable code thereon for communications. The computer readable medium generally includes code for sending, to a network entity, a request with an information element (IE) indicating one or more protocol data unit (PDU) sessions to be transferred from a source network to a target network, code for receiving, from the network entity, a response with an IE identifying one or more of the PDU sessions allowed to be transferred to the target network and indicating slice information applicable in the target network for the one or more PDU sessions allowed to be transferred, and code for updating slice information for each of the PDU sessions allowed to be transferred based on the IE in the response.

Certain aspects provide a computer readable medium storing computer executable code thereon for communications. The computer readable medium generally includes code for receiving, from a user equipment (UE), a request with an information element (IE) indicating one or more protocol data unit (PDU) sessions to be transferred from a source network to a target network, code for determining slice information for one or more of the PDU sessions allowed to be transferred, and code for sending, to the UE, a response with an IE identifying the one or more of the PDU sessions allowed to be transferred to the target network and indicating the slice information applicable in the target network for the one or more PDU sessions allowed to be transferred.

Certain aspects provide a computer readable medium storing computer executable code thereon for communications. The computer readable medium generally includes code for receiving an indication to start a backoff timer, code for determining mapping information for a PDU session, code for refraining from sending session management requests for PDU sessions which have same mapping information as the PDU session while the backoff timer is running.

Certain aspects provide a computer readable medium storing computer executable code thereon for communications. The computer readable medium generally includes code for receiving, from a network entity, an information element (IE) identifying one or more of the PDU sessions and indicating slice information for those PDU sessions, code for receiving a request for a packet data network (PDN) connection reactivation, and code for processing the request based on the information in the IE.

Certain aspects provide a computer readable medium storing computer executable code thereon for communications. The computer readable medium generally includes code for receiving, from a network entity, an information element (IE) identifying one or more of the PDU sessions and indicating slice information for those PDU sessions, and code for updating slice information for each of the PDU sessions based on the IE.

Certain aspects provide a computer readable medium storing computer executable code thereon for communications. The computer readable medium generally includes code for determining slice information for one or more of the PDU sessions with a user equipment (UE), and code for sending the UE an IE indicating the slice information for those PDU sessions.

Certain aspects provide an apparatus for wireless communications by a user equipment (UE). The apparatus generally includes a memory, and at least one processor coupled to the memory, the memory and the processor configured to: send, to a network entity, a request with an information element (IE) indicating one or more protocol data unit (PDU) sessions to be transferred from a source network to a target network, receive, from the network entity, a response with an IE identifying one or more of the PDU sessions allowed to be transferred to the target network and indicating slice information applicable in the target network for the one or more PDU sessions allowed to be transferred, and update slice information for each of the PDU sessions allowed to be transferred based on the IE in the response.

Certain aspects provide an apparatus for wireless communications by a network entity. The apparatus generally includes a memory, and at least one processor coupled to the memory, the memory and the processor configured to: receive, from a user equipment (UE), a request with an information element (IE) indicating one or more protocol data unit (PDU) sessions to be transferred from a source network to a target network, determine slice information for one or more of the PDU sessions allowed to be transferred, and send, to the UE, a response with an IE identifying the one or more of the PDU sessions allowed to be transferred to the target network and indicating the slice information applicable in the target network for the one or more PDU sessions allowed to be transferred.

Certain aspects provide an apparatus for wireless communications by a user equipment (UE). The apparatus generally includes a memory, and at least one processor coupled to the memory, the memory and the apparatus configured to: receive an indication to start a backoff timer, determine mapping information for a protocol data unit (PDU) session, and refrain from sending session management requests for PDU sessions which have same mapping information as the PDU session while the backoff timer is running.

Certain aspects provide an apparatus for wireless communications by a user equipment (UE). The apparatus generally includes a memory, and at least one processor coupled to the memory, the memory and the processor configured to: receive, from a network entity, an information element (IE) identifying one or more of the PDU sessions and indicating slice information for those PDU sessions, and receive a request for a packet data network (PDN) connection reactivation, and process the request based on the information in the IE.

Certain aspects provide an apparatus for wireless communications by a user equipment (UE). The apparatus generally includes a memory, and at least one processor coupled to the memory, the processor and the memory configured to: receive, from a network entity, an information element (IE) identifying one or more of the PDU sessions and indicating slice information for those PDU sessions, and update slice information for each of the PDU sessions based on the IE.

Certain aspects provide an apparatus for wireless communications by a network entity. The apparatus generally includes a memory, and at least one processor coupled to the memory, the at least one processor and the memory configured to determine slice information for one or more of the PDU sessions with a user equipment (UE), and send the UE an IE indicating the slice information for those PDU sessions.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 illustrates an example single network slice selection assistance information (S-NSSAI) information element (IE).

FIGS. 8A and 8B illustrates example alternatives for an information element (IE) to convey slice information for PDU sessions, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for handling slice information for a roaming UE. For example, the techniques presented herein may help update slice information for PDU sessions a UE transfers to a target system while roaming.

According to certain aspects, when moving to a new network, the UE may provide information about PDU sessions it requests to be transferred. In response, the network may provide the UE with information regarding applicable slice information for PDU sessions allowed to be transferred.

The UE may include the information about the PDU sessions in an information element (IE) provided in a Registration Request message. An Access and Mobility Management Function (AMF) of the network may provide, in a Registration Accept message, an IE containing applicable slide information for PDU sessions allowed to be transferred.

The following description provides examples of handling slice information for roaming UEs in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Figure 1:
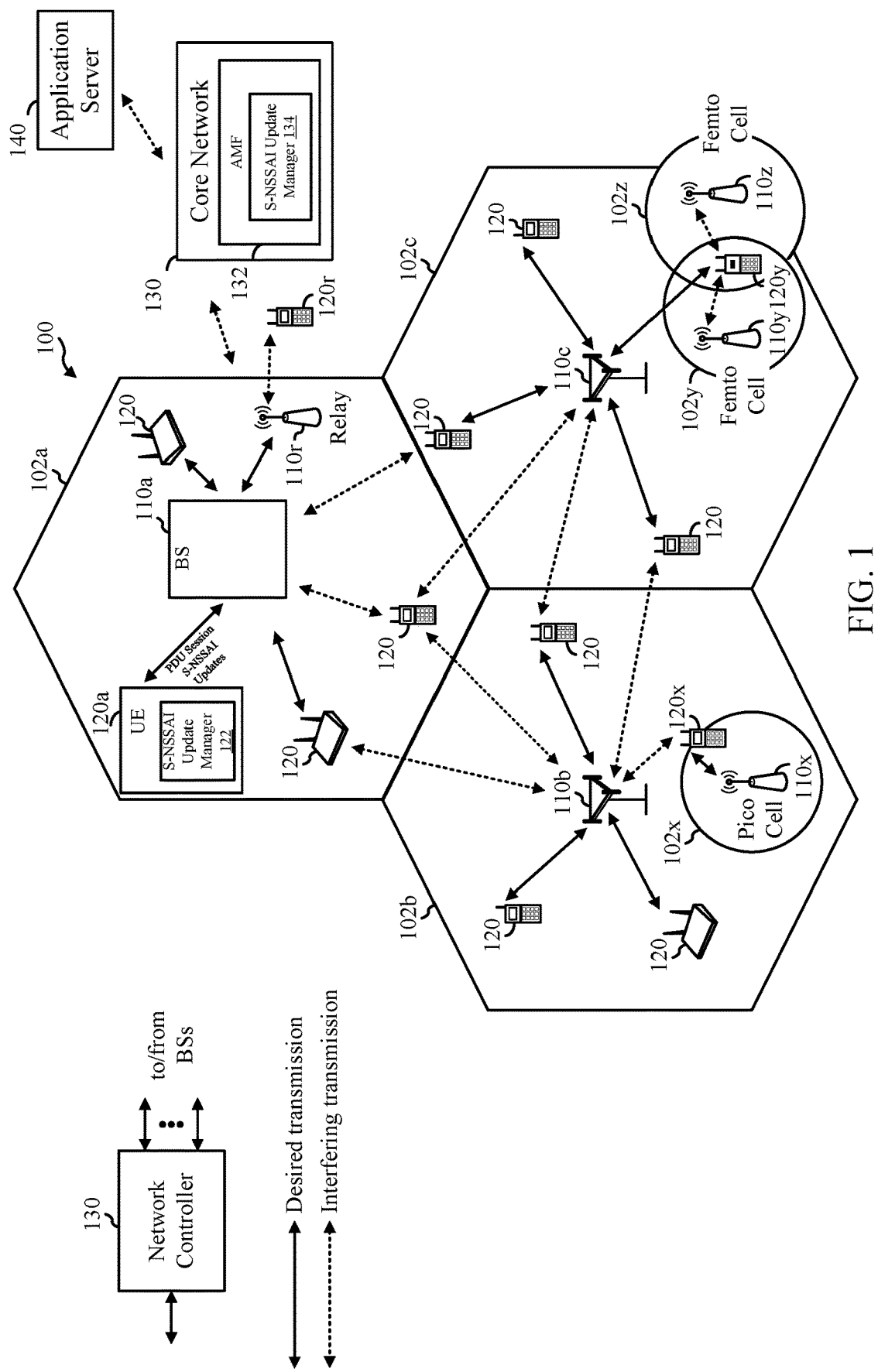
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, a UE 120a may have a single network slice selection assistance information (S-NSSAI) update manager 122 configured to communicate (via a BS 110a) with an AMF 132 with an S-NSSAI Update Manager 134 to update slice information for one or more PDU sessions transferred to a target system (for which BS 110a serves as the RAN interface). As an alternative, or in addition, UE 120a may be configured to perform operations 900 of FIG. 9, operations 1000 of FIG. 10 and/or operations 1100 of FIG. 11.

As shown in FIG. 1, the wireless communication network 100 may be in communication with a core network 130. The core network 130 may in communication with one or more BSs 110 and/or UEs 120 via one or more interfaces, as well with an application server 140.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for one or more services (e.g., URLLC, eMBB, XR, etc.) involving traffic flows between the application provider (e.g., the application server 140) and/or BSs 110 and UEs 120 associated with one or more applications running on the UEs 120. For example, the UE 120a may be requesting admission (e.g., requesting the BS 110a to serve as a link between the UE 120a and the AS 140) for the one or more traffic flows for a service related to an application.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The wireless communication network 100 may be part of a radio access network (RAN) which may be in communication with a core network (CN). In turn the CN may be in communication with an application provider, for example, via an application server (AS).

Figure 2:
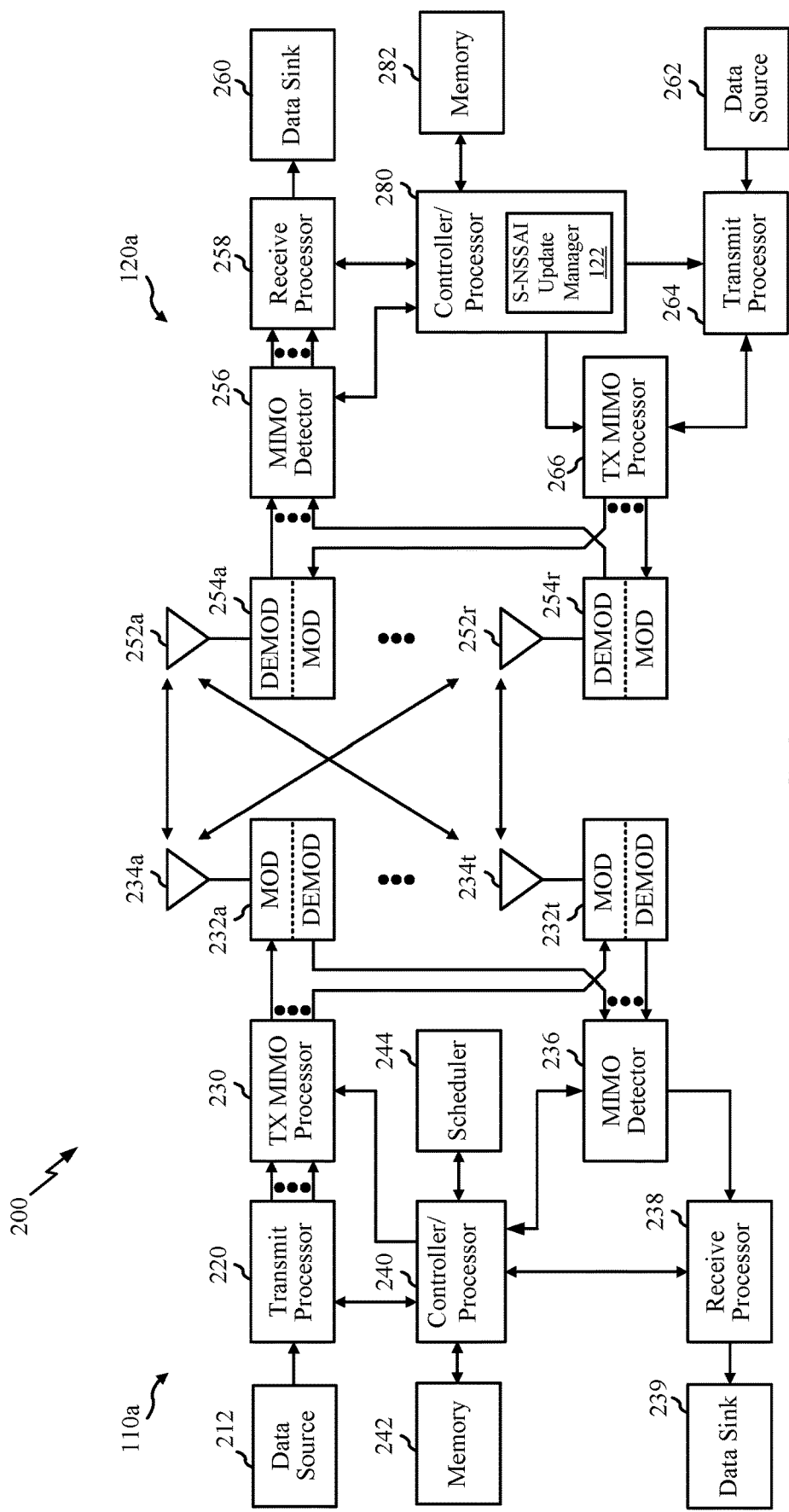
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t in transceivers. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) 254a-254r in transceivers, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, the controller/processor 280 of the UE 120a may include/implement the S-NSSAI Update Manager 122 configured to perform operations 500 of FIG. 5, operations 900 of FIG. 9, operations 1000 of FIG. 10 and/or operations 1100 of FIG. 11.

Figure 3:
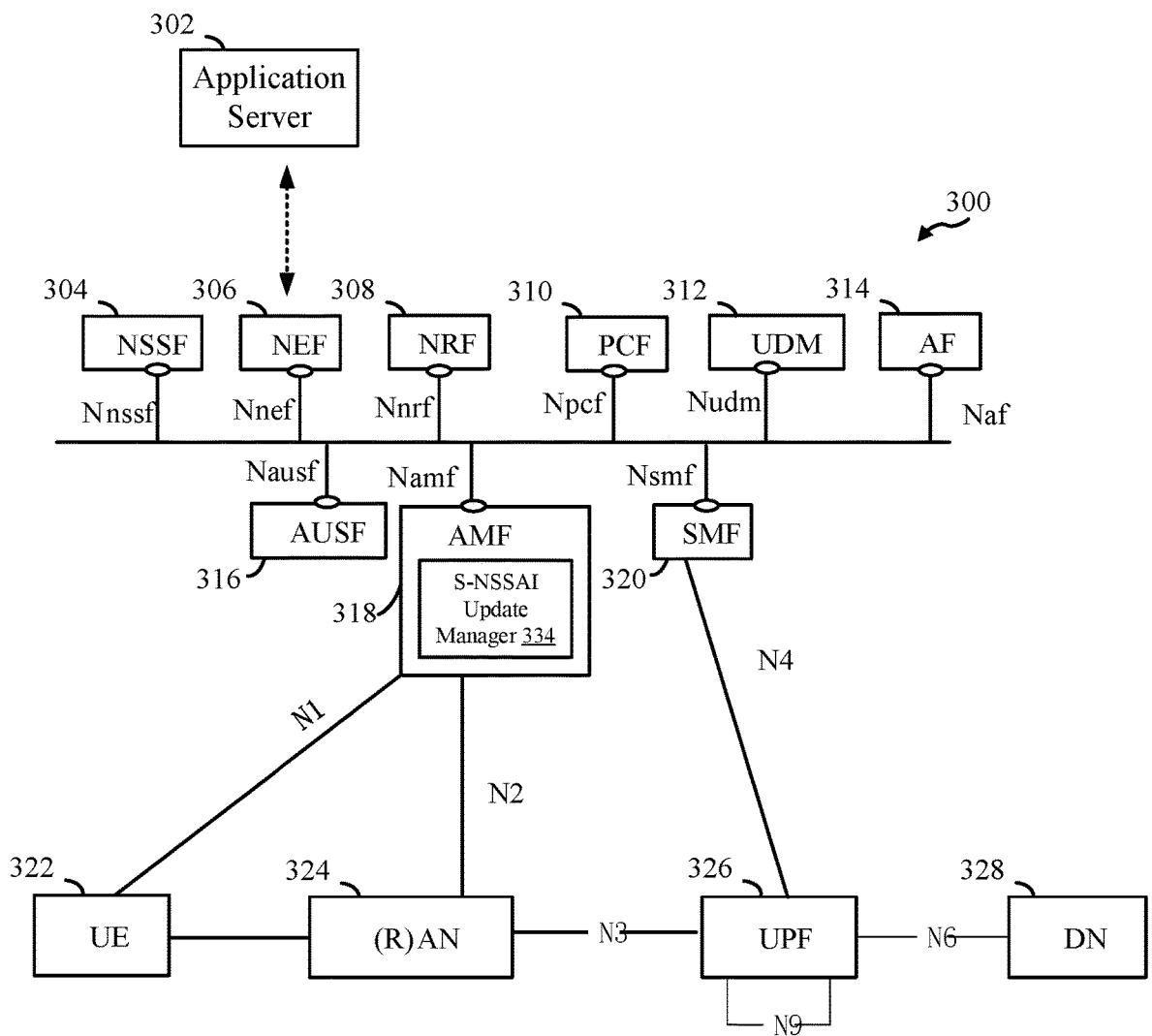
FIG. 3 is a block diagram illustrating an example architecture of a core network and radio access network (RAN) in communication with an application server (AS), in accordance with certain aspects of the present disclosure.

FIG. 3 is a block diagram illustrating an example architecture of a CN 300 (e.g., such as the CN 130 in FIG. 1) in communication with a RAN 324 and AS 302 (e.g., such as the AS 140 in FIG. 1), in accordance with certain aspects of the present disclosure. As shown in FIG. 3, the example architecture includes the CN 300, RAN 324, UE 322, and data network (DN) 328 (e.g. operator services, Internet access or third party services).

The CN 300 may host core network functions. CN 300 may be centrally deployed. CN 300 functionality may be offloaded (e.g., to advanced wireless services (AWS)), in an effort to handle peak capacity. As shown in FIG. 3, the example CN 300 may be implemented by one or more network entities that perform network functions (NF) including Network Slice Selection Function (NSSF) 304, Network Exposure Function (NEF) 306, NF Repository Function (NRF) 308, Policy Control Function (PCF) 310, Unified Data Management (UDM) 312, Application Function (AF) 314, Authentication Server Function (AUSF) 316, Access and Mobility Management Function (AMF) 318, Session Management Function (SMF) 320; User Plane Function (UPF) 326, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 318 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 322 and SMF 320; transparent proxy for routing SM messages; access authentication; access authorization; transport for short message service (SMS) messages between UE 322 and a SMS function (SMSF); Security Anchor Functionality (SEAF); Security Context Management (SCM), which receives a key from the SEAF that it uses to derive access-network specific keys; Location Services management for regulatory services; transport for Location Services messages between UE 322 and a location management function (LMF) as well as between RAN 324 and LMF; evolved packet service (EPS) bearer ID allocation for interworking with EPS; and/or UE mobility event notification; and/or other functionality.

SMF 320 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 326 may support: packet routing and forwarding, packet inspection, quality-of-service (QoS) handling, external protocol data unit (PDU) session point of interconnect to DN 328, and anchor point for intra-RAT and inter-RAT mobility. PCF 310 may support: unified policy framework, providing policy rules to control protocol functions, and/or access subscription information for policy decisions in UDR. AUSF 316 may acts as an authentication server. UDM 312 may support: generation of Authentication and Key Agreement (AKA) credentials, user identification handling, access authorization, and subscription management. NRF 308 may support: service discovery function, and maintain NF profile and available NF instances.

NEF 306 may support: exposure of capabilities and events, secure provision of information from external application to 3GPP network, translation of internal/external information. AF 314 may support: application influence on traffic routing, accessing NEF 306, and/or interaction with policy framework for policy control.

As shown in FIG. 3, the CN 300 may be in communication with the AS 302, UE 322, RAN 324, and DN 328. In some examples, the CN 300 communicates with the external AS 203 via the NEF 306 and/or AF 314.

Example Network Slice Selection Functionality

NSSF 304 may support: selecting of the Network Slice instances to serve the UE 322, determining the allowed network slice selection assistance information (NSSAI), and/or determining the AMF set to be used to serve the UE 322.

The NSSF 304 may support the following functionality: selecting of the network slice instances to serve the UE 322; determining the allowed NSSAI; and/or determining the AMF set to be used to serve the UE 322. A network slice may be defined as a logical network that provides specific network capabilities and network characteristics. A network slice instance may be defined as a set of network function instances and the required resources (e.g., compute, storage, and networking resources) which form a deployed network slice.

A network slice is identified by single network slice selection assistance information (S-NSSAI). NSSAI generally refers to a list of one or more S-NSSAIs. Each S-NSSAI may be defined by values conveyed in an S-NSSAI information element (IE).

As illustrated in FIG. 4, an S-NSSAI IE 400 may include a slice/service type (SST), which refers to the expected network slice behavior (e.g., features and services), and a slice differentiator (SD), which is optional information that complements the SST(s) to differentiate amongst multiple network slices of the same SST. An S-NSSAI can have standard values (e.g., including an SST with a standardized SST value and no SD) or non-standard values (e.g., including an SST and an SD or including an SST without a standardized SST value and no SD). An S-NSSAI with a non-standard value identifies a single network slice within the PLMN with which it is associated. An S-NSSAI with a non-standard value may not be used by the UE in access stratum procedures in any PLMN other than the one to which the S-NSSAI is associated.

Network slices may differ with respects to supported features and network functions optimizations. For example, different S-NSSAIs may have different SSTs. An operator can deploy multiple network slice instances delivering the same features, but for different groups of UEs (e.g., dedicated to a customer different S-NSSAIs with the same SST but different SDs). The network may serve a single UE with one or more network slice instances simultaneously (e.g., via the 5G-AN). In some examples, a UE may be associated with up to eight different S-NSSAIs in total.

AMF instances can be common to network slice instances serving a UE. Selection of the set of network slice instances for a UE is triggered by the first contacted AMF in a registration procedure normally by interacting with the NSSF. A PDU session may belong to one specific network slice instance per PLMN. Different network slice instances may not share a PDU session, though different slices may have slice-specific PDU sessions using the same DNN.

Example Handling of NSSAI Information for Roaming UE

Aspects of the present disclosure relate to handling of network slice information for a roaming user equipment (UE). For example, techniques presented herein may help update S-NSSAI values for PDU sessions transferred to a target system by a roaming UE.

The techniques presented herein may address various example scenarios when a UE is roaming with home-routed (HR) packet data network (PDN) connection (in EPS) or HR PDU session (in 5GS). In a first example scenario (Scenario A), the UE may move from a first Visited Public Land Mobile Network (VPLMN 1) in an evolved packet service (EPS) network, to a 5GS network of the same VPLMN 1. In this example scenario, the UE receives the S-NSSAI of HPLMN (i.e., mapping information only), for example, as part of protocol configuration options (PCO). In the target system, there are two general cases: where the UE does not have NSSAI information for VPLMN 1 or where the UE has NSSAI information for VPLMN 1.

In a second example scenario (Scenario B), the UE may move from a first VPLMN (VPLMN 1) in a 5GS network, to a second VPLMN (VPLMN 2) in the 5GS network. In this scenario, the UE receives (from the network e.g. the AMF) the S-NSSAI of VPLMN 1 with the mapping information (shown in FIG. 3). In the target system, there are again two general cases: where the UE does not have NSSAI information for VPLMN 2 or where the UE has NSSAI information for VPLMN 2.

One approach to address the scenario A discussed above, where the UE does not have applicable S-NSSAI (e.g., S-NSSAI with values considered valid), is to utilize a reserved value for S-NSSAI in the requested NSSAI (R-NSSAI) to indicate (to the AMF) the UE does not have S-NSSAI information applicable to the network that the UE is moving to (which may be referred to as applicable S-NSSAI information). This may be explained considering an example that assumes the UE received the S-NSSAI mapping information "H1" in PCO. In this case, the UE sets S-NSSAI of VPLMN (in the R-NSSAI IE) to zero (this is a mandatory field that cannot be empty) and sets the mapping information to the value received in the PCO. In other words, the UE sends the S-NSSAI as {0, H1}.

On the AMF side, the value zero indicates that the UE does not have an applicable S-NSSAI for this PLMN and the AMF provides an S-NSSAI (in the A-NSSAI IE) such that the S-NSSAI of this PLMN (e.g., V1) is allowed and corresponds to the mapping information that is received from the UE. In other words, the AMF sends {V1, H1} in the A-NSSAI.

One approach to address the scenario A in the second case discussed above, where the UE does have NSSAI information for VPLMN 1, is for the UE to set S-NSSAI of VPLMN (in the R-NSSAI IE) associated with the same mapping information as that received in the PCO (e.g., V1) and set the mapping information to H1. In this case, the UE sends the S-NSSAI as {V1, H1}.

On the AMF side, the AMF determines (from UE context) which S-NSSAI is associated with the PDU session that is being transferred to 5GS (e.g., based on H1) and verifies if V1 is allowed for the UE. In this case, the AMF sends {V1, H1} in the A-NSSAI, assuming V1 is still an applicable S-NSSAI that maps to H1 (e.g., it is possible that {V1a, H1} is now the applicable/allowed slice).

When using the approaches described above, the mechanism for the UE setting the R-NSSAI is different depending on availability of a Configured NSSAI (C-NSSAI) for the target VPLMN. In other words, the UE sends a zero value when the UE does not have NSSAI information for VPLMN 2, while the UE sends the available S-NSSAI when the UE has NSSAI information for VPLMN 2.

Aspects of the present disclosure provide alternative techniques that may help address the scenarios discussed above, and provide simpler and more consistent options for the UE and network behavior for the identified scenarios with respect to handling of the Requested NSSAI (R-NSSAI) and Allowed NSSAI (A-NSSAI).

As will be described below, techniques provide herein allow for the S-NSSAI associated with a PDU session to be updated during the lifetime of the PDU session. Aspects of the present disclosure also provides options for verifying the association of 5GSM backoff (BO) timers with S-NSSAI. Aspects of the present disclosure also provides options for the UE behavior with respect to handling a 5GSM cause #39 "reactivation requested" for PDU sessions with session and service continuity (SSC) mode 3.

Figure 5:
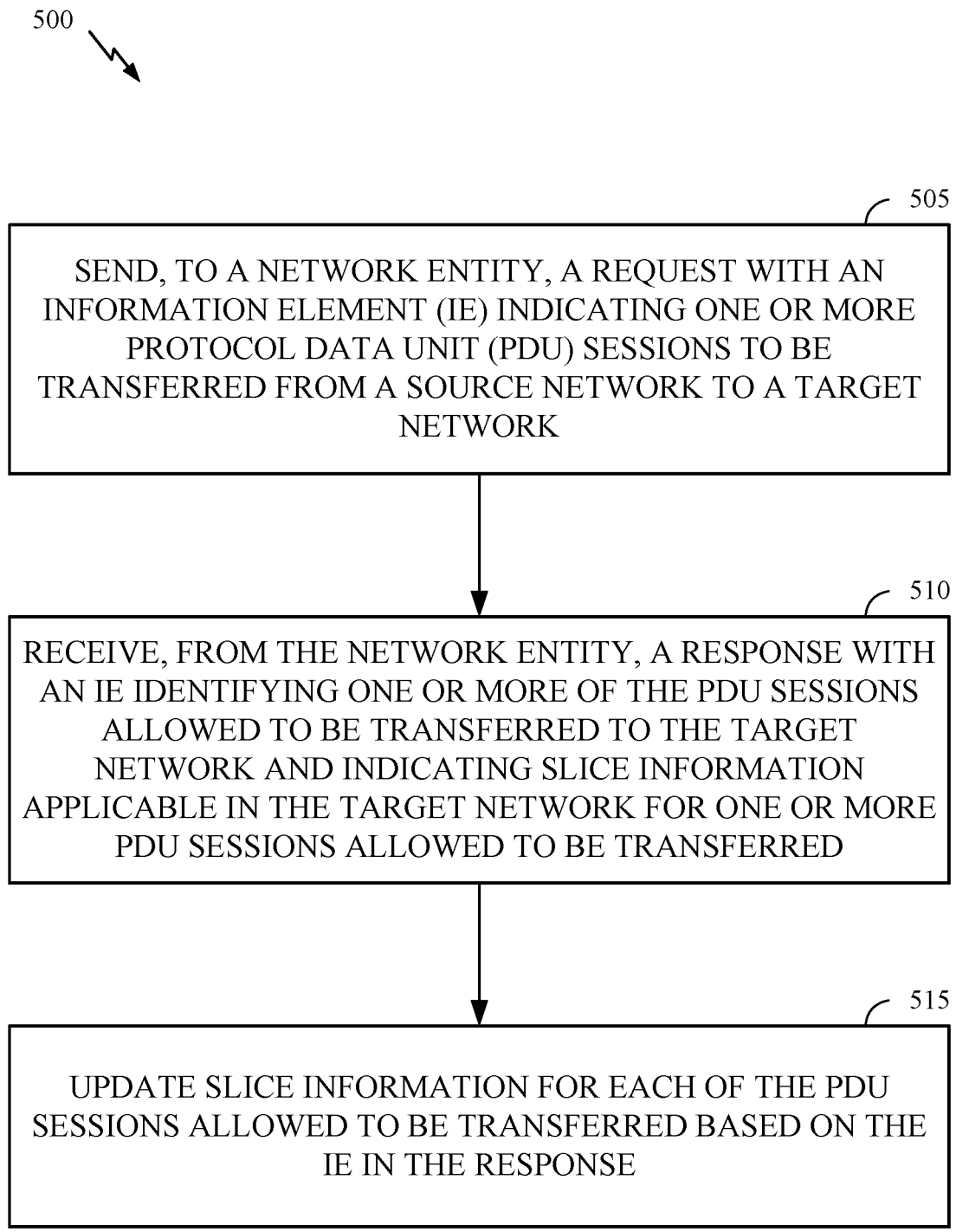
FIG. 5 illustrates example operations for wireless communications by a user equipment (UE), in accordance with certain aspects of the present disclosure.
Figure 6:
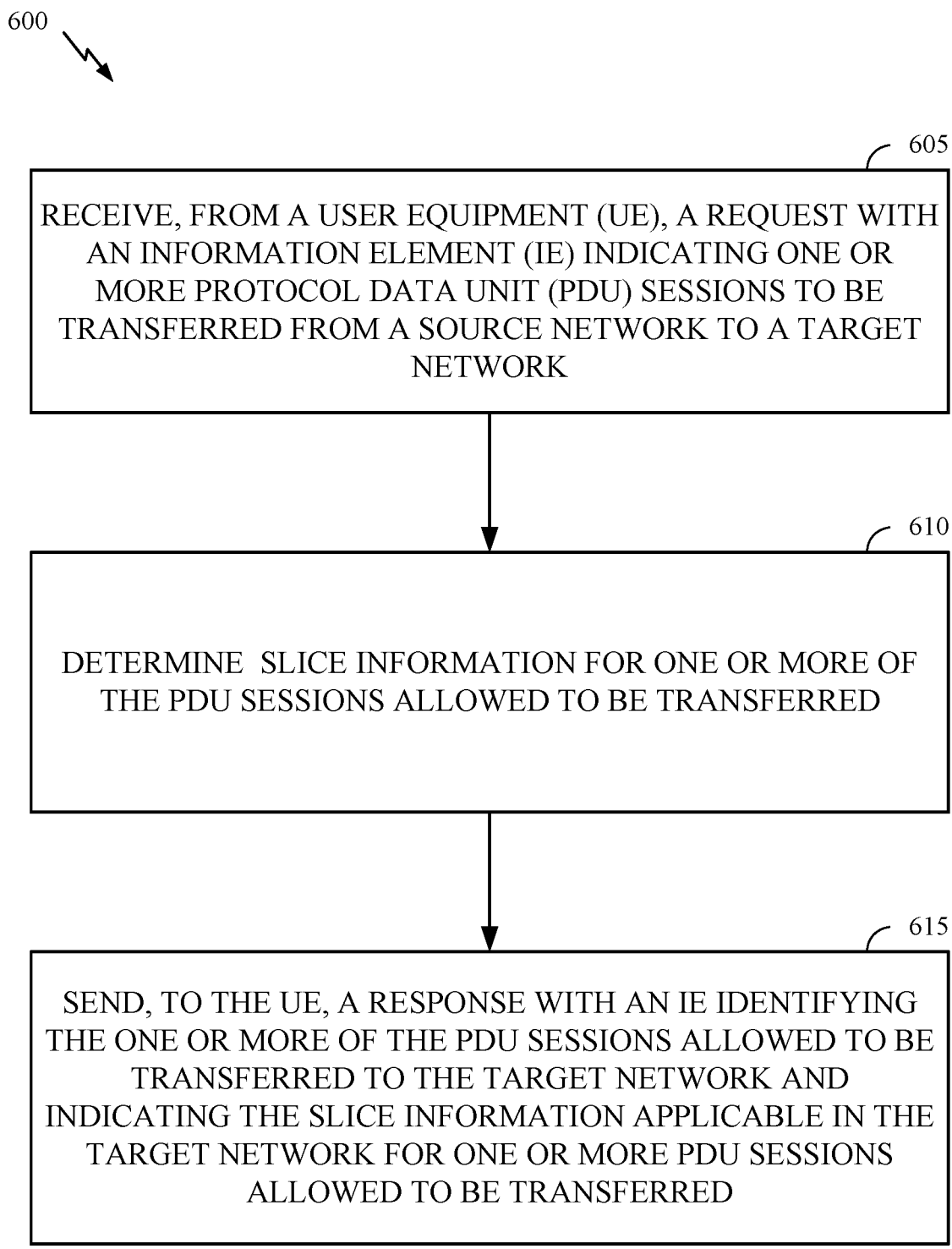
FIG. 6 illustrates example operations for wireless communications by a network entity, in accordance with certain aspects of the present disclosure.

FIGS. 5 and 6 illustrate UE and AMF-side operations, respectively, a general technique to update S-NSSAI of existing PDU sessions, in accordance with aspects of the present disclosure. The technique generally allows an AMF to provision (e.g., in a Registration Accept message), the S-NSSAIs associated with the mapped S-NSSAIs indicated by the UE (e.g., in a Registration Request message).

Figure 13:
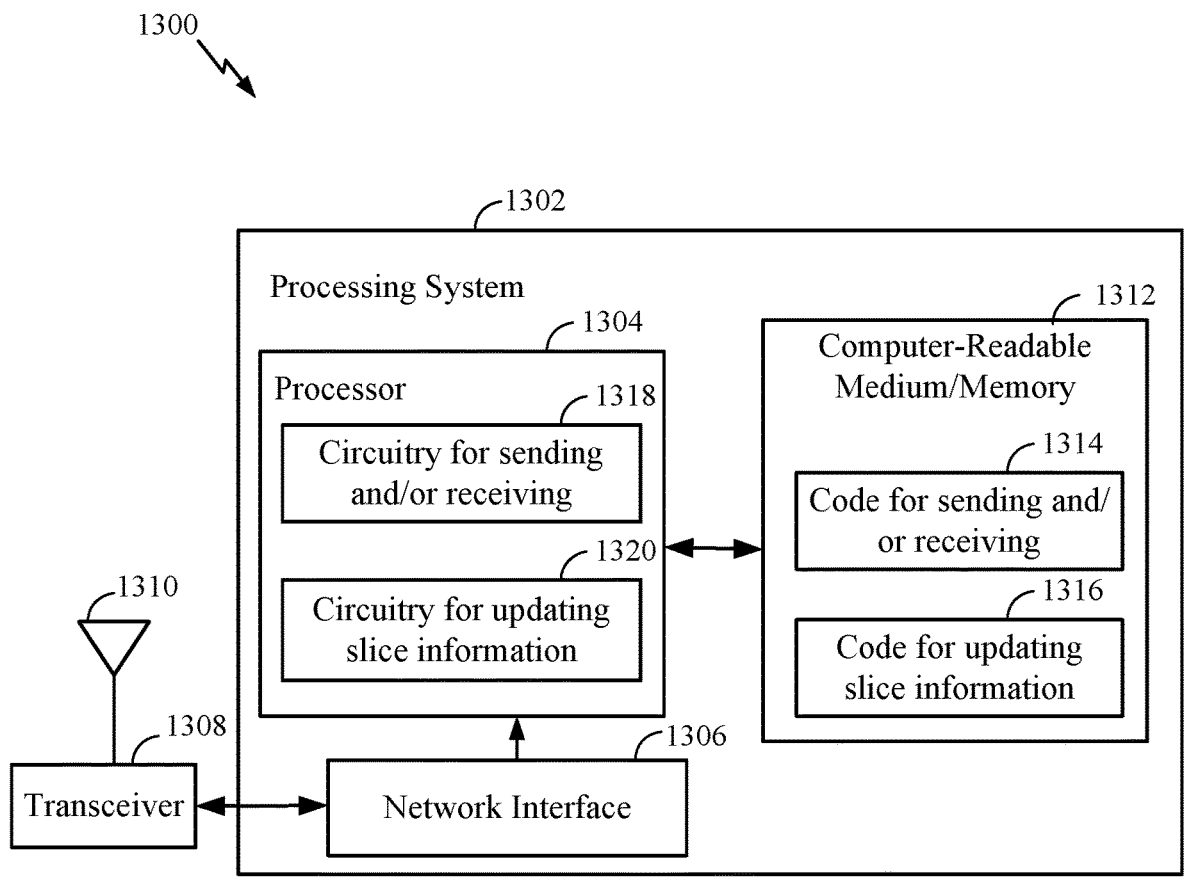
FIG. 13 illustrates an example communications device that may include various components configured to perform operations for the techniques disclosed herein in accordance with aspects of the present disclosure.

Operations 500 of FIG. 5 may be performed, for example, by UE 120a shown in FIG. 1 and/or UE 1302 shown in FIG. 13 (or components thereof).

Operations 500 begin, at 505, by sending, to a network entity, a request with an information element (IE) indicating one or more protocol data unit (PDU) sessions to be transferred from a source network to a target network. For example, the IE may be a newly defined IE referred to as a "Requested PDU sessions for transfer" IE and may be sent in a Registration Request message.

At 510, the UE receives, from the network entity, a response with an IE identifying one or more of the PDU sessions allowed to be transferred to the target network and indicating slice information applicable in the target network for the one or more PDU sessions allowed to be transferred. In some cases, the AMF may send a new IE with PDU session ID and the associated applicable S-NSSAI. The new IE can be sent, for example, in a Registration Accept message.

At 515, the UE updates slice information for each of the PDU sessions allowed to be transferred based on the IE in the response. FIGS. 8A and 8B illustrate example formats of the IE in the response and how the UE may determine the updated slice information (e.g., S-NSSAI values) for each of the allowed/transferred PDUs accordingly.

Operations 600 of FIG. 6 may be considered network-side operations complementary to operations 500 of FIG. 5. For example, operations 600 may be performed, for example, by AMF 218 shown in FIG. 2 and/or network entity 1402 shown in FIG. 14 (or components thereof) to provide updated slice information to a UE performing operations 500 of FIG. 5.

Operations 600 begin, at 605, by receiving, from a user equipment (UE), a request with an information element (IE) indicating one or more protocol data unit (PDU) sessions to be transferred from a source network to a target network. At 610, the network entity determines slice information for one or more of the PDU sessions allowed to be transferred. At 615, the network entity sends, to the UE, a response with an IE identifying the one or more of the PDU sessions allowed to be transferred to the target network and indicating the slice information applicable in the target network for the one or more PDU sessions allowed to be transferred.

Figure 7:
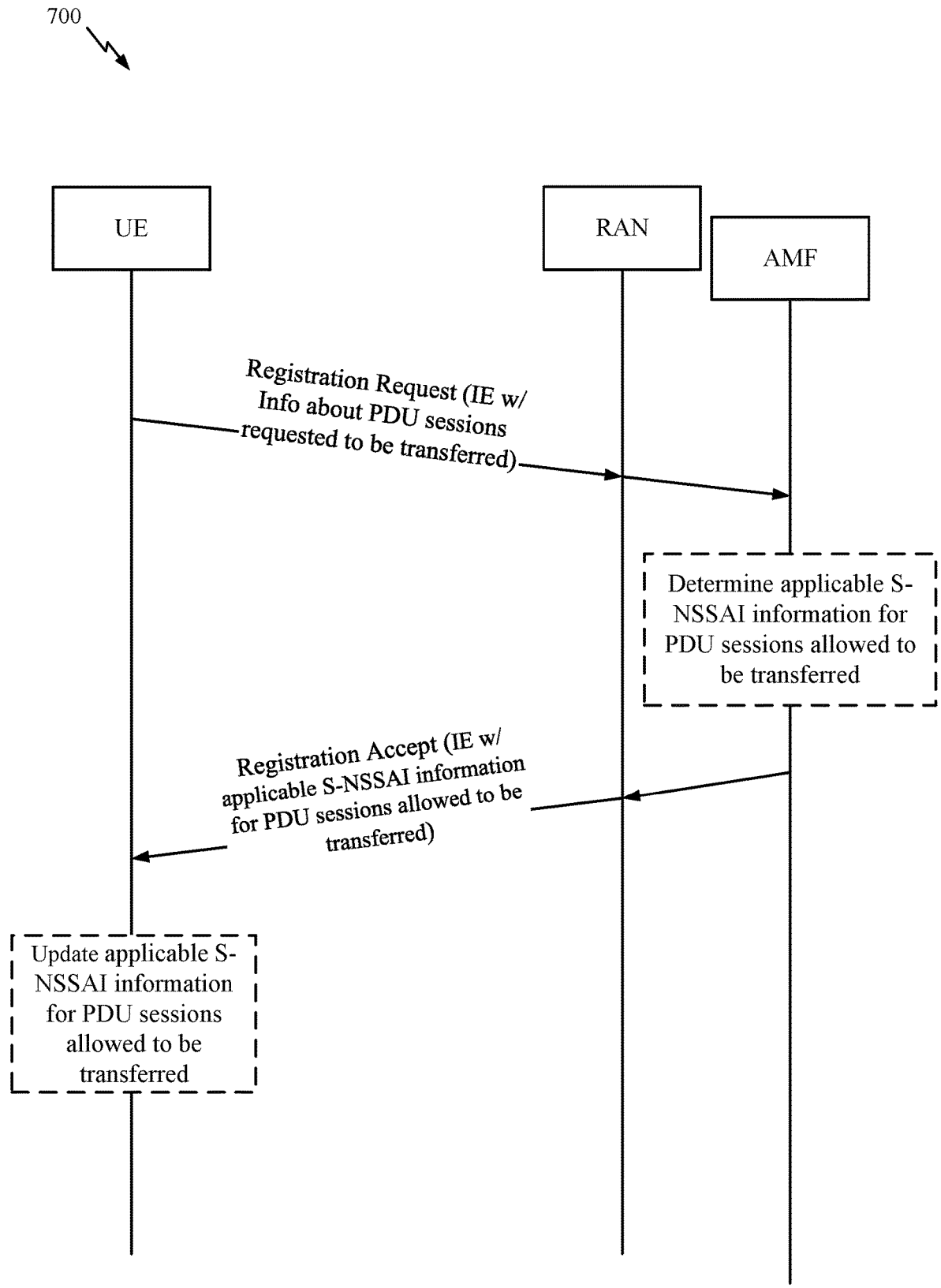
FIG. 7 illustrates an example call flow diagram for updating slice information for PDU sessions, in accordance with certain aspects of the present disclosure.

Operations 500 of FIG. 5 and operations 600 of FIG. 6 may be understood with reference to the call flow diagram of FIG. 7. In other words, the UE in FIG. 7 may perform operations 500 of FIG. 5, while the AMF may perform operations 600 of FIG. 6.

As illustrated, when moving to a new network, the UE may send a Registration Request that includes an IE containing information about PDU sessions the UE requests to be transferred. Based on the information in the IE, the AMF may determine applicable S-NSSAI information for the PDU sessions allowed to be transferred. The AMF may provide this information via the Registration Accept message that includes an IE containing the applicable S-NSSAI information for the PDU sessions allowed to be transferred.

There are various example alternatives for updating slice information for PDU sessions, in accordance with certain aspects of the present disclosure. The example alternatives may differ in exactly what information is provided and in what format.

According to a first alternative (Alternative 1), the UE sends a new IE containing {mapping information} only (e.g., the S-NSSAI of the HPLMN). This mapping information may be the only relevant information necessary to link with the existing session (the UE wants to transfer). Even if the UE has slice information for the serving PLMN, this might have changed in the network (e.g., the UE has {V3, H1} for the serving PLMN, but the actual applicable slice may now be {V3a, H1}).

According to a second alternative (Alternative 2), the UE sends a new IE containing a bitmap of PDU session identities only (e.g., each bit set indicates a session to be transferred). In this case, the PDU session identity will not change, so the mapped information can be determined in the network when the UE context is fetched from the source system/PLMN.

A third alternative (Alternative 3) may be considered a combination of Alternatives 1 and 2. In other words, the UE may send a new IE containing the PDU session identities and also the corresponding mapping information for each session to be transferred (FIGS. 8A and 8B provide examples of how the information in such an IE could be encoded). The new IE, in either alternative may be sent by the UE in the Registration Request message as shown in FIG. 7.

In either of these alternatives, the AMF may determine the mapped information that is associated with the PDU session to be transferred (either directly from the UE if provided (e.g., in a Requested NSSAI IE or Requested mapped NSSAI IE), or from the retrieved UE context). The AMF then sends the applicable S-NSSAI associated with the session being transferred and may also send a new IE with PDU session ID and the associated applicable S-NSSAI (this new IE may be used for generic S-NSSAI updates of existing PDU sessions). As shown in FIG. 7, the new IE can be sent in the Registration Accept message (e.g., if the UE included the requested NSSAI in the REGISTRATION REQUEST message and the AMF allows one or more S-NSSAIs for the current PLMN in the Requested NSSAI IE or one or more mapped S-NSSAIs in the Requested NSSAI IE or Requested mapped NSSAI IE).

It may be beneficial if the AMF was configured such that either alternative triggers the AMF to provide the UE with all the relevant and up to date information (e.g., C-NSSAI and A-NSSAI).

These alternative approaches may have certain advantages over previous solutions described above. For example, there may be no need to verify if the UE has applicable NSSAI information for the target PLMN and no need to check the S-NSSAIs for a match with the mapping information. In some example implementations, the UE may indicate the sessions that should be transferred, without using a reserved value (which, as described above, may be valid in Rel. 15 AMFs, potentially creating backward compatibility issues). This may be relatively efficient since if the UE has both the mapped ST and mapped SD, the UE has to set the SD field for the VPLMN (e.g., to Hex. FFFFFF).

There are various approaches to updating the S-NSSAI of a PDU session, some of which may require updates to a standard specification. For example, if the UE had requested to transfer a session in the Registration Request message, upon reception of the A-NSSAI the UE may need to perform certain processing, for every PDU session that is indicated as active. For example, the UE may check for a match of the mapping information between that of the active sessions and the S-NSSAI in the A-NSSAI. If matched, the UE then updates the S-NSSAI of the corresponding PDU session.

On the other hand, if a new IE is used by the AMF, then the UE may simply update the S-NSSAI information based on values in this new IE. FIGS. 8A and 8B illustrate example alternatives for an IE, in accordance with certain aspects of the present disclosure. As illustrated in FIG. 8A, a first format may include a bitmap with bit values to indicate PDF sessions for which S-NSSAI values are provided in the IE. For example, the first S-NSSAI value may correspond to the first PSI bit that is set to 1, the second S-NSSAI value may correspond to the second PSI bit that is set to 1, and so on for the 16 bits of the bitmap (in this example). As illustrated in the example format of FIG. 8B, a full PDU session identity may be provided for each session being transferred, along with (followed by) the corresponding S-NSSAI values.

In either format of FIG. 8A or 8B, when the UE receives the IE (e.g., the Accepted PDU sessions for transfer IE), the UE, for each PDU session identity indicated in the received IE, updates (replaces) the S-NSSAI information of the PDU session using the new S-NSSAI value, If the UE sent the IE (e.g. the Requested PDU sessions for transfer IE) but did not receive the IE (e.g. the Accepted PDU sessions for transfer IE) in the Registration Accept message (i.e. in the response from the network), then the UE may be configured to locally release all the PDU sessions that were requested to be transferred to the target system/VPLMN.

If the UE sent the IE (e.g. the Requested PDU sessions for transfer IE) but the UE receives the IE (e.g. the Accepted PDU sessions for transfer IE) in the Registration Accept message indicating that some PDU sessions were not transferred (or only some PDU sessions were transferred), then the UE may only locally release any PDU session that was requested (to be transferred) by the UE but was not indicated as transferred in the received IE from the network.

As noted above, aspects of the present disclosure may also provide techniques for verifying the association of (5GSM) backoff (BO) timers (e.g., based on updated S-NSSAI values). Conventionally, a BO timer is associated with what the UE provided at PDU session establishment. If no S-NSSAI is provided, then the BO timer is associated with no S-NSSAI. This is also applicable for PDN connections that are transferred from EPS to 5GS. The 5GSM congestion re-attempt indicator IE was introduced to indicate whether the BO applies for the serving PLMN only or for all PLMNs. If applicable for all PLMNs, then the UE cannot send any 5GSM request in any PLMN for which the mapped information in the selected S-NSSAI matches the mapped information associated with the BO timer.

According to techniques presented herein, the UE may change the association of a backoff timer to link it to a current network slice. This may allow a UE to send 5GSM requests in the event of an update to a new PLMN that is not indicated as congested, as well as help avoid sending 5GSM requests in the event an updated PLMN is congested.

Figure 9:
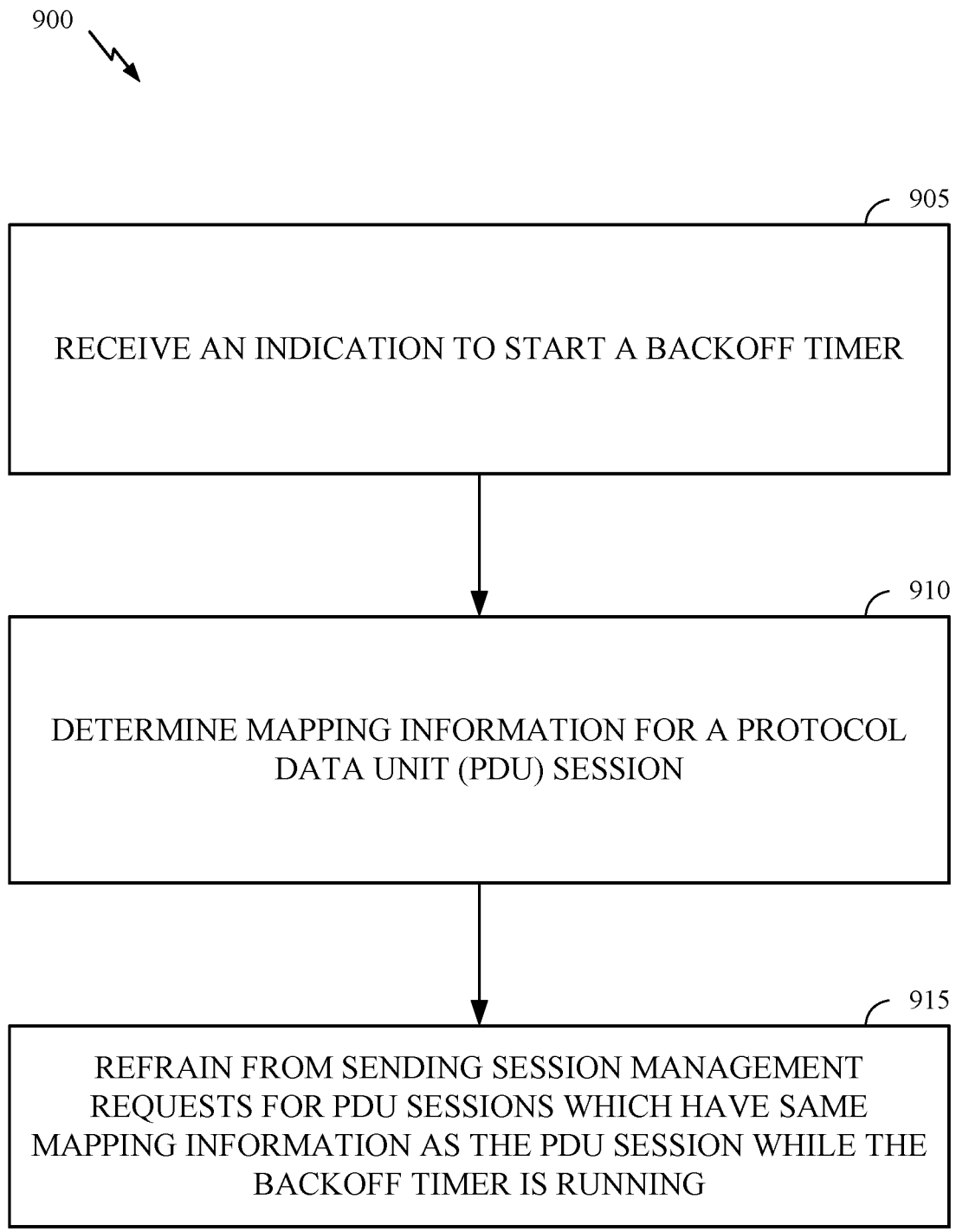
FIG. 9 illustrates example operations for wireless communications by a user equipment (UE), in accordance with certain aspects of the present disclosure.

FIG. 9 illustrates example operations 900 for associating a backoff timer with slice information, in accordance with certain aspects of the present disclosure. Operations 900 of FIG. 9 may be performed, for example, by UE 120a shown in FIG. 1 and/or UE 1302 shown in FIG. 13 (or components thereof).

Operations 900 begin, at 905, by receiving an indication to start a backoff timer, determining mapping information for a protocol data unit (PDU) session. At 910, the UE refrains from sending session management requests for PDU sessions which have same mapping information as the PDU session while the backoff timer is running.

According to certain aspects, when the UE receives a backoff timer applicable in all PLMNs and the UE had requested a specific S-NSSAI during PDU session establishment, the UE associates the backoff timer with the mapped S-NSSAI of the HPLMN for the PDU session. The UE may refrain from sending session management requests for PDU sessions which have same mapping information as the PDU session.

Referring to the updated S-NSSAI values in the example described above, a UE may receive a backoff timer, initially associated with what was provided at establishment (e.g., {V1 H1}). This association may be changed to link to the updated slice information {V2 H1}, otherwise the UE may continue to send session management requests for {V2 H1} which has congestion as indicated by the backoff timer. Updating the association to {V2 H1} may help achieve congestion control when NSSAI information is updated (e.g., the backoff timer may effectively block requests for S-NSSAIs that have the same mapping information).

As noted above, aspects of the present disclosure may also provide techniques for accounting for updated S-NSSAI associations in other scenarios, such as in the event of a cause code indicating a reactivation requested (the 5GSM cause used by the network to request a PDU session reactivation). Conventionally, a UE re-initiates the UE-requested PDU session establishment procedure with a new PDU session ID for the: PDU session type associated with the present PDU session, SSC mode associated with the present PDU session, DNN associated with the present PDU session, and the S-NSSAI associated with (if available in roaming scenarios) a mapped S-NSSAI if provided in the UE-requested PDU session establishment procedure of the present PDU session.

Figure 10:
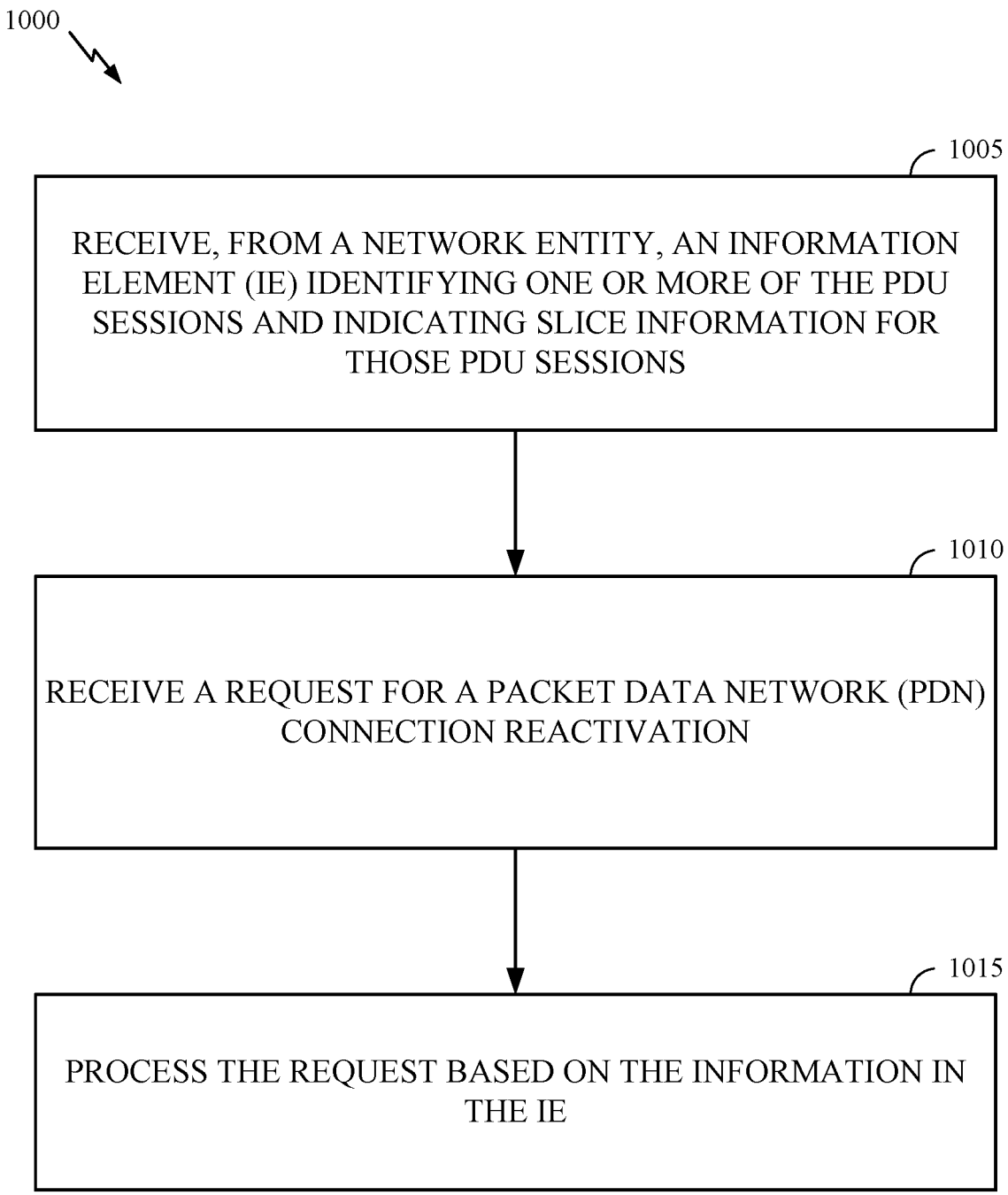
FIG. 10 illustrates example operations for wireless communications by a user equipment (UE), in accordance with certain aspects of the present disclosure.

FIG. 10 illustrates example operations 1000 that allow for this scenario to be updated. Operations 1000 may be performed, for example, by UE 120a shown in FIG. 1 and/or UE 1302 shown in FIG. 13 (or components thereof).

Operations 1000 begin, at 1005, by receiving, from a network entity, an information element (IE) identifying one or more of the PDU sessions and indicating slice information for those PDU sessions, receiving a request for a packet data network (PDN) connection reactivation. At 1010, the UE process the request based on the information in the IE. Operations 1000 may address the case, for example, when the UE receives a 5GSM cause code used by the network to request a PDU session reactivation (e.g., 5GSM cause #39) is received after the S-NSSAI has been updated. In this case, the UE can use the current S-NSSAI that is associated with the PDU session (i.e. the updated S-NSSAI if applicable).

Aspects of the present disclosure may also provide techniques for generally updating the S-NSSAI of existing PDU sessions. For example, FIGS. 11 and 12 illustrate example operations 1100 and 1200 that may be performed by a UE and network entity (e.g., AMF) to generally update S-NSSAI of existing PDU sessions.

Operations 1100 begin, at 1105, by receiving, from a network entity, an information element (IE) identifying one or more of the PDU sessions and indicating slice information for those PDU sessions. At 1110, the UE updates slice information for each of the PDU sessions based on the IE.

Operations 1200 begin, at 1205, by determining slice information for one or more of the PDU sessions with a user equipment (UE). At 1210, the network entity sends the UE an IE indicating the slice information for those PDU sessions Operations 1100 and 1200 may help address use cases for which it is desirable to change the S-NSSAI associated with a PDU session (per operator/local policy) but without changing the actual SMF, UPF, or other resources that are currently used for the session. In such cases, the new IE described above (with reference to FIGS. 7 and 8) may be used for this purpose. For example, based on operator policy, the AMF may determine to update the slice information of the existing PDU sessions of a UE. To do so, the AMF may send the new IE (e.g. the Accepted PDU sessions for transfer IE) in the Registration Accept message or Configuration Update Command message and the UE updates the slice information accordingly for the indicated PDU session identity. When the UE receives the new IE (e.g., the Accepted PDU sessions for transfer IE), the UE, for each PDU session identity indicated in the received IE, updates (replaces) the S-NSSAI information of the PDU session using the new S-NSSAI value. The UE may then send a Registration Complete or Configuration Update Complete message respectively. The techniques described above are not limited to roaming UEs only.

Figure 11:
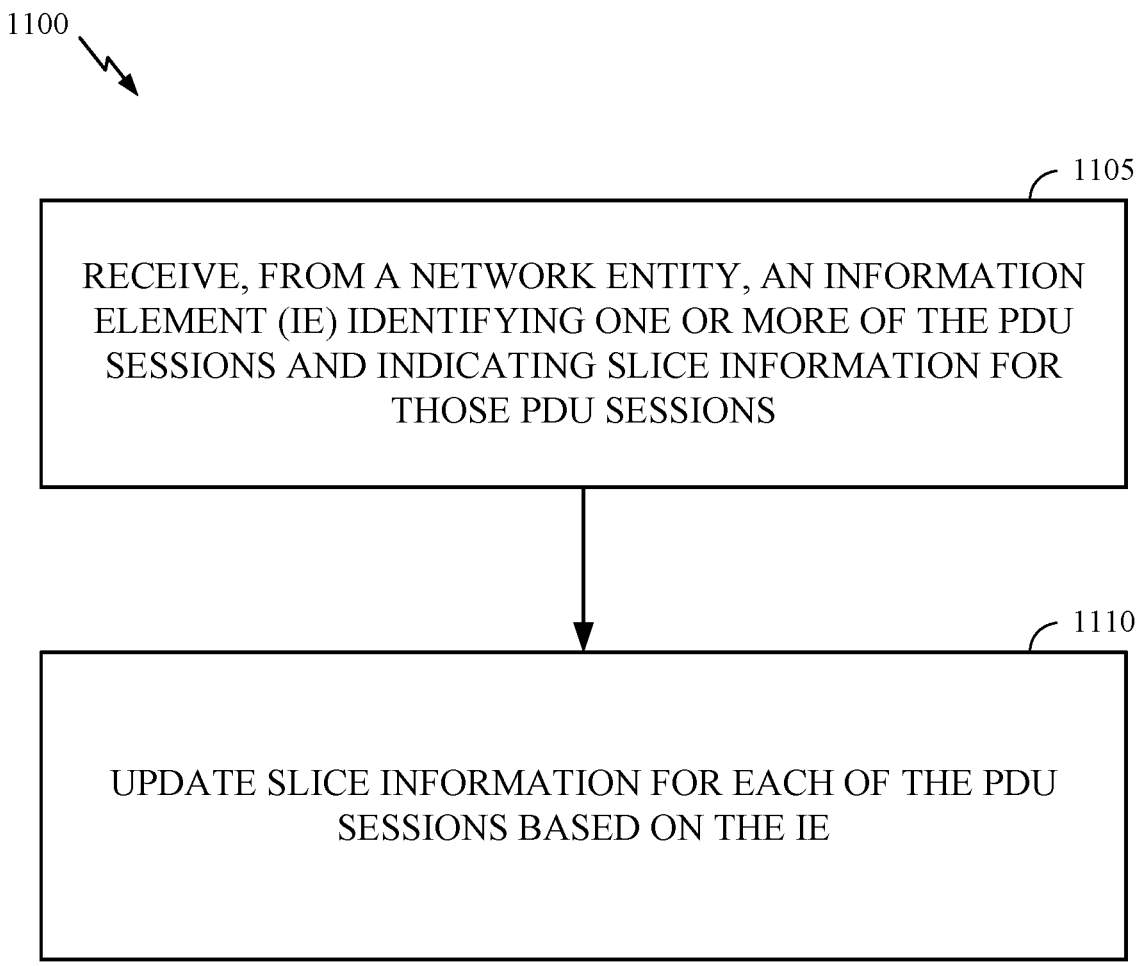
FIG. 11 illustrates example operations for wireless communications by a user equipment (UE), in accordance with certain aspects of the present disclosure.
Figure 12:
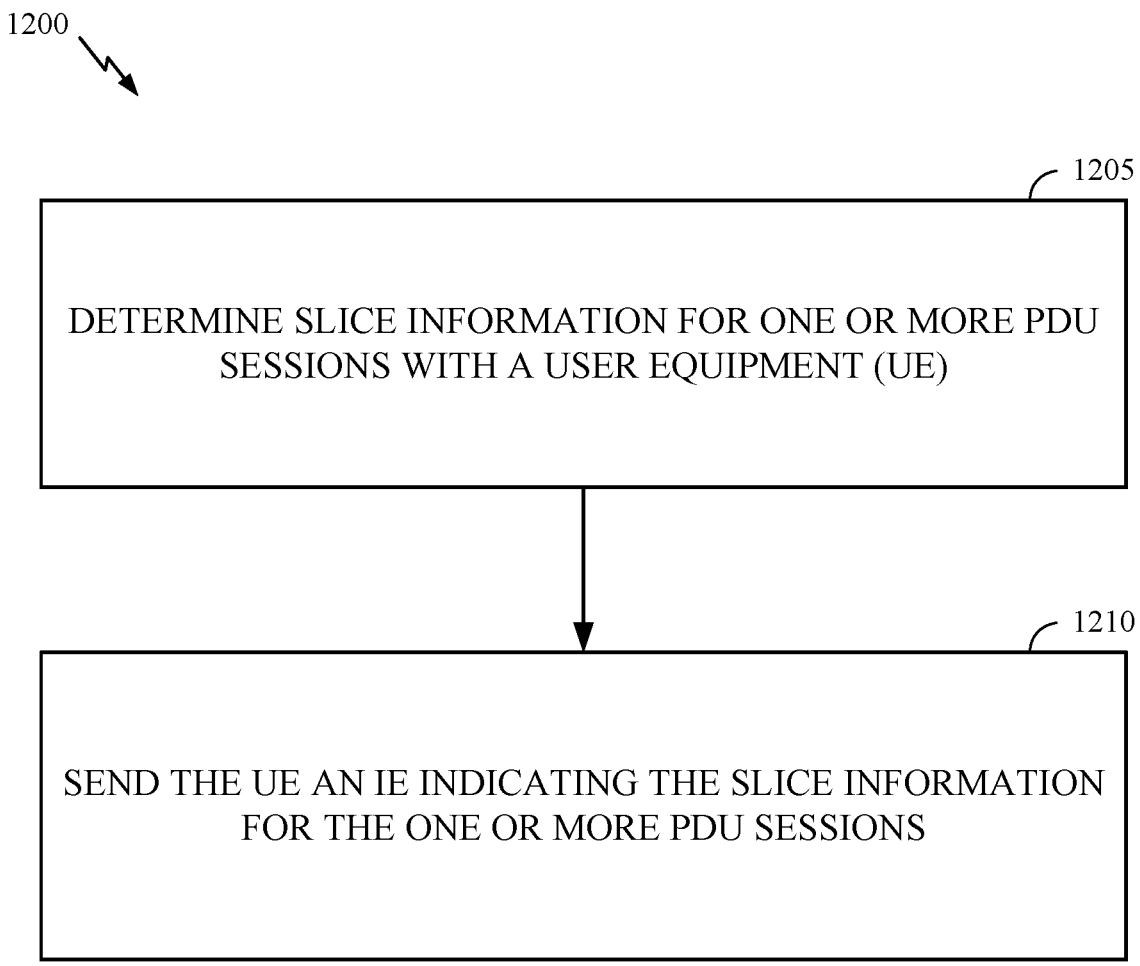
FIG. 12 illustrates example operations for wireless communications by a network entity, in accordance with certain aspects of the present disclosure.

FIG. 13 illustrates example communications device 1300 (e.g., a UE) that may include various components (e.g., corresponding to means-plus-function components) configured to perform operations for the techniques disclosed herein, such as the operations illustrated in FIG. 5, FIG. 9, FIG. 10, and/or FIG. 11. In some examples, the communication device 1300 is a network entity such as a core network entity or a RAN entity (such as a BS). The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus. In certain aspects, the computer-readable medium/memory 1312 is configured to store instructions (e.g., computer-executable code) that when executed by the processor 1304, cause the processor 1304 to perform the operations illustrated in FIG. 5, FIG. 9, FIG. 10, and/or FIG. 11 or other operations for performing the various techniques discussed herein for traffic burst factor awareness in a communication system. In certain aspects, computer-readable medium/memory 1312 stores code 1314 for sending and/or receiving (e.g., for sending, to a network entity, a request with an information element (IE) indicating one or more protocol data unit (PDU) sessions to be transferred from a source network to a target network and/or receiving, from the network entity, a response with an IE identifying one or more of the PDU sessions allowed to be transferred to the target network and indicating slice information in the target network for those PDU sessions allowed to be transferred), in accordance with aspects of the present disclosure; and code 1316 for updating the slice information (e.g., updating slice information for each of the PDU sessions allowed to be transferred based on the IE in the response), in accordance with aspects of the present disclosure. In certain aspects, the processor 1304 has circuitry configured to implement the code stored in the computer-readable medium/memory 1312. The processor 1304 includes circuitry 1318 for sending and/or receiving (e.g., for sending, to a network entity, a request with an information element (IE) indicating one or more protocol data unit (PDU) sessions to be transferred from a source network to a target network and/or receiving, from the network entity, a response with an IE identifying one or more of the PDU sessions allowed to be transferred to the target network and indicating slice information in the target network for those PDU sessions allowed to be transferred); and circuitry 1320 for updating the slice information (e.g., updating slice information for each of the PDU sessions allowed to be transferred based on the IE in the response).

The processor 1304 is coupled with network interface 1306. The network interface 1306 is configured to communicate with a wireless network. The network interface 1306 may be wired and/or wireless and communicate with the wireless network via the transceiver 1308 and antenna 1310 or via a hardwired connection.

Figure 14:
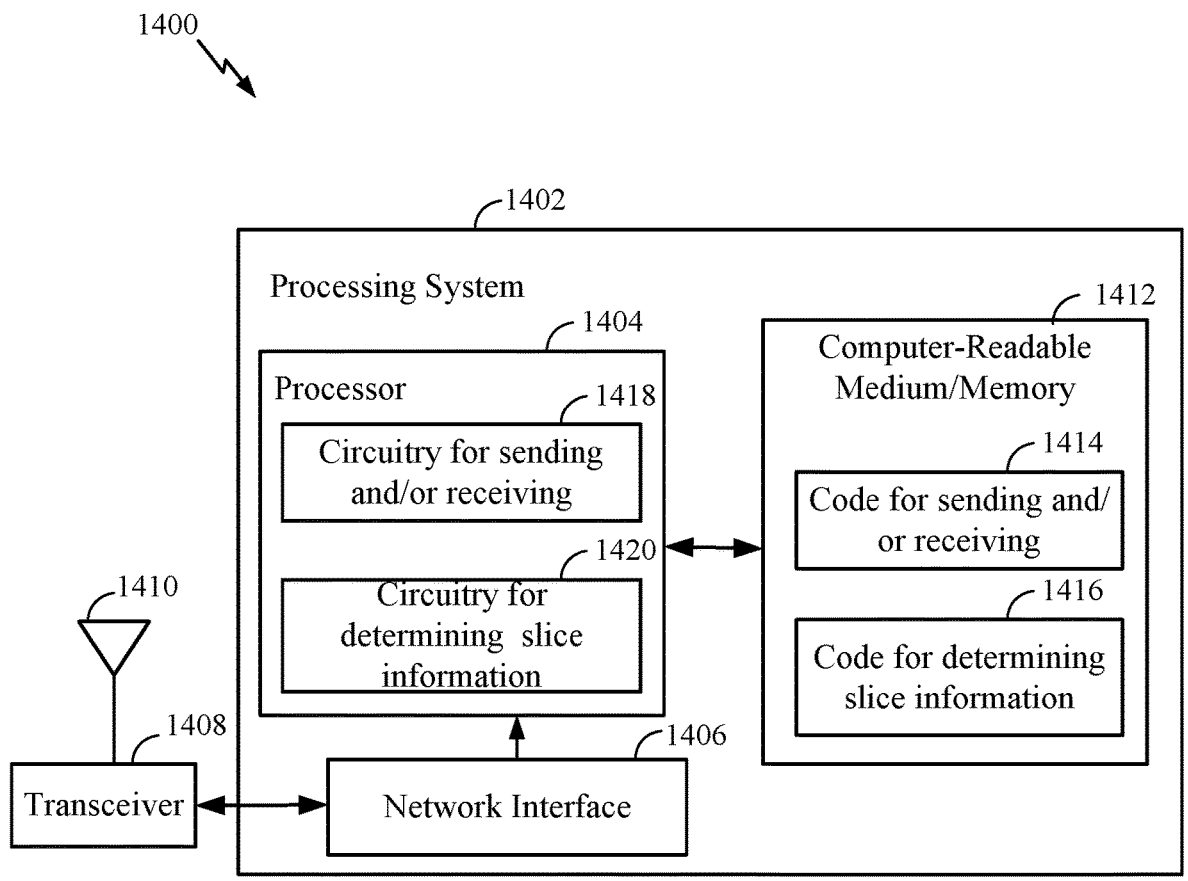
FIG. 14 illustrates an example communications device that may include various components configured to perform operations for the techniques disclosed herein in accordance with aspects of the present disclosure.

FIG. 14 illustrates example communications device 1400 (e.g., a network entity such as an AMF) that may include various components (e.g., corresponding to means-plus-function components) configured to perform operations for the techniques disclosed herein, such as the operations illustrated in FIG. 6 and/or FIG. 12. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus. In certain aspects, the computer-readable medium/memory 1412 is configured to store instructions (e.g., computer-executable code) that when executed by the processor 1404, cause the processor 1404 to perform the operations illustrated in FIG. 6 and/or FIG. 12, or other operations for performing the various techniques discussed herein for traffic burst factor awareness in a communication system. In certain aspects, computer-readable medium/memory 1412 stores code 1414 for sending and/or receiving (e.g., receiving, from a user equipment (UE), a request with an information element (IE) indicating one or more protocol data unit (PDU) sessions to be transferred from a source network to a target network and/or sending, to the UE, a response with an IE identifying the one or more of the PDU sessions allowed to be transferred to the target network and indicating the slice information applicable in the target network for those PDU sessions allowed to be transferred), in accordance with aspects of the present disclosure; and code 1416 for determining slice information (e.g., determining slice information for one or more of the PDU sessions allowed to be transferred), in accordance with aspects of the present disclosure. In certain aspects, the processor 1404 has circuitry configured to implement the code stored in the computer-readable medium/memory 1412. The processor 1404 includes circuitry 1418 for sending and/or receiving (e.g., receiving, from a user equipment (UE), a request with an information element (IE) indicating one or more protocol data unit (PDU) sessions to be transferred from a source network to a target network and/or sending, to the UE, a response with an IE identifying the one or more of the PDU sessions allowed to be transferred to the target network and indicating the slice information applicable in the target network for those PDU sessions allowed to be transferred); and circuitry 1420 for determining slice information (e.g., determining slice information for one or more of the PDU sessions allowed to be transferred).

The processor 1404 is coupled with network interface 1406. The network interface 1406 is configured to communicate with a wireless network. The network interface 1406 may be wired and/or wireless and communicate with the wireless network via the transceiver 1408 and antenna 1410 or via a hardwired connection.

The following provides an overview of examples of the present disclosure:

Example 1

A method for wireless communications by a user equipment (UE), comprising: sending, to a network entity, a request with an information element (IE) indicating one or more protocol data unit (PDU) sessions to be transferred from a source network to a target network; receiving, from the network entity, a response with an IE identifying one or more of the PDU sessions allowed to be transferred to the target network and indicating slice information applicable in the target network for one or more PDU sessions allowed to be transferred; and updating slice information for each of the PDU sessions allowed to be transferred based on the IE in the response.

Example 2

The method of example 1, wherein the IE in the request comprises: mapping information linking the one or more PDU sessions to be transferred with the source network.

Example 3

The method of example 2, wherein the mapping information comprises a single network slice selection assistance information (S-NSSAI) of a Home Public Land Mobile Network (HPLMN).

Example 4

The method of any one of examples 1 through 3, wherein: the source network comprises an evolved packet system (EPS); and the target network comprises a Visited Public Land Mobile Network (VPLMN).

Example 5

The method of any one of examples 1 through 4, wherein: the source network comprises a first Visited Public Land Mobile Network (VPLMN); and the target network comprises a second VPLMN.

Example 6

The method of any one of examples 1 through 5, wherein the IE in the request comprises: a bitmap identifying the PDU sessions to be transferred.

Example 7

The method of example 6, wherein the IE in the request further comprises: mapping information linking the one or more PDU sessions to be transferred with the source network.

Example 8

The method of any one of examples 1 through 7, wherein the IE in the response comprises: single network slice selection assistance information (S-NSSAI) values for each of the PDU sessions allowed to be transferred.

Example 9

The method of example 8, wherein the IE in the response further comprises: a bitmap indicating the PDU sessions allowed to be transferred.

Example 10

The method of example 8 or 9, wherein the IE in the response further comprises: an identity of each of the PDU sessions allowed to be transferred.

Example 11

A method for wireless communications by a network entity, comprising: receiving, from a user equipment (UE), a request with an information element (IE) indicating one or more protocol data unit (PDU) sessions to be transferred from a source network to a target network; determining slice information for one or more of the PDU sessions allowed to be transferred; and sending, to the UE, a response with an IE identifying the one or more of the PDU sessions allowed to be transferred to the target network and indicating the slice information applicable in the target network for one or more PDU sessions allowed to be transferred.

Example 12

The method of example 11, wherein: the IE in the request comprises mapping information linking the one or more PDU sessions to be transferred with the source network; and the network entity determines the slice information for each PDU session allowed to be transferred based on the mapping information.

Example 13

The method of example 12, wherein the mapping information comprises a single network slice selection assistance information (S-NSSAI) of a Home Public Land Mobile Network (HPLMN).

Example 14

The method of any one of examples 11 through 13, wherein: the source network comprises an evolved packet system (EPS); and the target network comprises a Visited Public Land Mobile Network (VPLMN).

Example 15

The method of any one of examples 11 through 14, wherein: the source network comprises a first Visited Public Land Mobile Network (VPLMN); and the target network comprises a second VPLMN.

Example 16

The method of any one of examples 11 through 15, wherein the IE in the request comprises: a bitmap identifying the PDU sessions to be transferred.

Example 17

The method of example 16, wherein: the IE in the request further comprises mapping information linking the one or more PDU sessions to be transferred with the source network; and the network entity determines the slice information for each PDU session allowed to be transferred based on the mapping information.

Example 18

The method of any one of examples 11 through 17, wherein the IE in the response comprises: single network slice selection assistance information (S-NSSAI) values for each of the PDU sessions allowed to be transferred.

Example 19

The method of example 18, wherein the IE in the response further comprises: a bitmap indicating the PDU sessions allowed to be transferred.

Example 20

The method of example 18, wherein the IE in the response further comprises: an identity of each of the PDU sessions allowed to be transferred.

Example 21

A method for wireless communications by a user equipment (UE), comprising: receiving an indication to start a backoff timer; determining mapping information for a protocol data unit (PDU) session; and refraining from sending session management requests for PDU sessions which have same mapping information as the PDU session while the backoff timer is running.

Example 22

A method for wireless communications by a user equipment (UE), comprising: receiving, from a network entity, an information element (IE) identifying one or more of the PDU sessions and indicating slice information for those PDU sessions; receiving a request for a packet data network (PDN) connection reactivation; and processing the request based on the information in the IE.

Example 23

A method for wireless communications by a user equipment (UE), comprising: receiving, from a network entity, an information element (IE) identifying one or more of the PDU sessions and indicating slice information for those PDU sessions; and updating slice information for each of the PDU sessions based on the IE.

Example 24

A method for wireless communications by a network entity, comprising: determining slice information for one or more of the PDU sessions with a user equipment (UE); and sending the UE an IE indicating the slice information for those PDU sessions.

Example 25

An apparatus for wireless communication comprising a processor, memory coupled with the processor, the processor and memory configured to perform a method of any one of examples 1 through 24.

Example 26

An apparatus for wireless communication comprising at least one means for performing a method of any one of examples 1 through 24.

Example 27

A non-transitory computer-readable medium storing code for wireless communication comprising a processor, memory coupled with the processor, and instructions stored in the memory and executable by the processor to cause the apparatus to perform a method of any one of examples 1 through 24.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
    sending, to a network entity, a request with an information element (IE) indicating one or more protocol data unit (PDU) sessions to be transferred from a source network to a target network, wherein the source network comprises an evolved packet system (EPS) and the target network comprises a Visited Public Land Mobile Network (VPLMN);
    receiving, from the network entity, a response with an IE identifying one or more of the PDU sessions allowed to be transferred to the target network and indicating slice information applicable in the target network for one or more PDU sessions allowed to be transferred; and
    updating slice information for each of the PDU sessions allowed to be transferred based on the IE in the response.

2. The method of claim 1, wherein the IE in the request comprises:
    mapping information linking the one or more PDU sessions to be transferred with the source network.

3. The method of claim 2, wherein the mapping information comprises a single network slice selection assistance information (S-NSSAI) of a Home Public Land Mobile Network (HPLMN).

4. The method of claim 1, wherein the IE in the request comprises:
    a bitmap identifying the PDU sessions to be transferred.

5. The method of claim 4, wherein the IE in the request further comprises:
    mapping information linking the one or more PDU sessions to be transferred with the source network.

6. The method of claim 1, wherein the IE in the response comprises:
    single network slice selection assistance information (S-NSSAI) values for each of the PDU sessions allowed to be transferred.

7. The method of claim 6, wherein the IE in the response further comprises:
    a bitmap indicating the PDU sessions allowed to be transferred.

8. The method of claim 6, wherein the IE in the response further comprises:
    an identity of each of the PDU sessions allowed to be transferred.

9. A method for wireless communications by a user equipment (UE), comprising:
    sending, to a network entity, a request with an information element (IE) indicating one or more protocol data unit (PDU) sessions to be transferred from a source network to a target network, wherein the source network comprises a first Visited Public Land Mobile Network (VPLMN) and the target network comprises a second VPLMN;
    receiving, from the network entity, a response with an IE identifying one or more of the PDU sessions allowed to be transferred to the target network and indicating slice information applicable in the target network for one or more PDU sessions allowed to be transferred; and
    updating slice information for each of the PDU sessions allowed to be transferred based on the IE in the response.

10. A method for wireless communications by a network entity, comprising:
    receiving, from a user equipment (UE), a request with an information element (IE) indicating one or more protocol data unit (PDU) sessions to be transferred from a source network to a target network, wherein the source network comprises an evolved packet system (EPS) and the target network comprises a Visited Public Land Mobile Network (VPLMN);
    determining slice information for one or more of the PDU sessions allowed to be transferred; and
    sending, to the UE, a response with an IE identifying the one or more of the PDU sessions allowed to be transferred to the target network and indicating the slice information applicable in the target network for one or more PDU sessions allowed to be transferred.

11. The method of claim 10, wherein:
    the IE in the request comprises mapping information linking the one or more PDU sessions to be transferred with the source network; and
    the network entity determines the slice information for each PDU session allowed to be transferred based on the mapping information.

12. The method of claim 11, wherein the mapping information comprises a single network slice selection assistance information (S-NSSAI) of a Home Public Land Mobile Network (HPLMN).

13. The method of claim 10, wherein the IE in the request comprises:
    a bitmap identifying the PDU sessions to be transferred.

14. The method of claim 13, wherein:
    the IE in the request further comprises mapping information linking the one or more PDU sessions to be transferred with the source network; and
    the network entity determines the slice information for each PDU session allowed to be transferred based on the mapping information.

15. The method of claim 10, wherein the IE in the response comprises:
    single network slice selection assistance information (S-NSSAI) values for each of the PDU sessions allowed to be transferred.

16. The method of claim 15, wherein the IE in the response further comprises:
    a bitmap indicating the PDU sessions allowed to be transferred.

17. The method of claim 15, wherein the IE in the response further comprises:
an identity of each of the PDU sessions allowed to be transferred.

18. A method for wireless communications by a network entity, comprising:
receiving, from a user equipment (UE), a request with an information element (IE) indicating one or more protocol data unit (PDU) sessions to be transferred from a source network to a target network, wherein the source network comprises a first Visited Public Land Mobile Network (VPLMN) and the target network comprises a second VPLMN;
determining slice information for one or more of the PDU sessions allowed to be transferred; and
sending, to the UE, a response with an IE identifying the one or more of the PDU sessions allowed to be transferred to the target network and indicating the slice information applicable in the target network for one or more PDU sessions allowed to be transferred.

19. An apparatus for wireless communications by a user equipment (UE), comprising:
a memory; and
at least one processor communicatively coupled to the memory, the memory comprising instructions executable by the at least one processor to cause the apparatus to:
send, to a network entity, a request with an information element (IE) indicating one or more protocol data unit (PDU) sessions to be transferred from a source network to a target network, wherein the source network comprises an evolved packet system (EPS) and the target network comprises a Visited Public Land Mobile Network (VPLMN);
receive, from the network entity, a response with an IE identifying one or more of the PDU sessions allowed to be transferred to the target network and indicating slice information applicable in the target network for one or more PDU sessions allowed to be transferred; and
update slice information for each of the PDU sessions allowed to be transferred based on the IE in the response.

20. An apparatus for wireless communications by a user equipment (UE), comprising:
a memory; and
at least one processor communicatively coupled to the memory, the memory comprising instructions executable by the at least one processor to cause the apparatus to:
send, to a network entity, a request with an information element (IE) indicating one or more protocol data unit (PDU) sessions to be transferred from a source network to a target network, wherein the source network comprises a first Visited Public Land Mobile Network (VPLMN) and the target network comprises a second VPLMN;
receive, from the network entity, a response with an IE identifying one or more of the PDU sessions allowed to be transferred to the target network and indicating slice information applicable in the target network for one or more PDU sessions allowed to be transferred; and
update slice information for each of the PDU sessions allowed to be transferred based on the IE in the response.

21. An apparatus for wireless communications by a network entity, comprising:
a memory; and
at least one processor communicatively coupled to the memory, the memory comprising instructions executable by the at least one processor to cause the apparatus to:
receiving, from a user equipment (UE), a request with an information element (IE) indicating one or more protocol data unit (PDU) sessions to be transferred from a source network to a target network, wherein the source network comprises an evolved packet system (EPS) and the target network comprises a Visited Public Land Mobile Network (VPLMN);
determining slice information for one or more of the PDU sessions allowed to be transferred; and
sending, to the UE, a response with an IE identifying the one or more of the PDU sessions allowed to be transferred to the target network and indicating the slice information applicable in the target network for one or more PDU sessions allowed to be transferred.

22. An apparatus for wireless communications by a network entity, comprising:
a memory; and
at least one processor communicatively coupled to the memory, the memory comprising instructions executable by the at least one processor to cause the apparatus to:
receiving, from a user equipment (UE), a request with an information element (IE) indicating one or more protocol data unit (PDU) sessions to be transferred from a source network to a target network, wherein the source network comprises a first Visited Public Land Mobile Network (VPLMN) and the target network comprises a second VPLMN;
determining slice information for one or more of the PDU sessions allowed to be transferred; and
sending, to the UE, a response with an IE identifying the one or more of the PDU sessions allowed to be transferred to the target network and indicating the slice information applicable in the target network for one or more PDU sessions allowed to be transferred.

* * * * *